(12) United States Patent
Kimura et al.

(10) Patent No.: US 9,808,981 B2
(45) Date of Patent: Nov. 7, 2017

(54) FUEL TANK MANUFACTURING METHOD AND FUEL TANK

(71) Applicant: TOYOTA JIDOSHA KABUSHIKI KAISHA, Toyota-shi (JP)

(72) Inventors: Miki Kimura, Nisshin (JP); Shingo Ogata, Toyoake (JP)

(73) Assignee: TOYOTA JIDOSH KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/798,789

(22) Filed: Jul. 14, 2015

(65) Prior Publication Data

US 2016/0016347 A1   Jan. 21, 2016

(30) Foreign Application Priority Data

Jul. 15, 2014   (JP) .................................. 2014-145391

(51) Int. Cl.
*B29C 49/00*   (2006.01)
*B29C 49/20*   (2006.01)
(Continued)

(52) U.S. Cl.
CPC .......... *B29C 49/0047* (2013.01); *B29C 49/20* (2013.01); *B29C 51/06* (2013.01); *B29C 51/12* (2013.01); *B29C 69/02* (2013.01); *B60K 15/03177* (2013.01); *B29C 49/0042* (2013.01); *B29C 49/02* (2013.01); *B29C 49/44* (2013.01); *B29C 51/10* (2013.01); *B29C 2791/001* (2013.01); *B29C 2791/006* (2013.01); *B29C 2791/007* (2013.01); *B29L 2031/7172* (2013.01); *B60K 2015/03032* (2013.01); *B60K 2015/03453* (2013.01); *B60K 2015/03493* (2013.01)

(58) Field of Classification Search
None
See application file for complete search history.

(56) References Cited

U.S. PATENT DOCUMENTS 5,308,427 A   5/1994   Duhaime et al.
6,679,399 B2   1/2004   Franjo et al.
(Continued)

FOREIGN PATENT DOCUMENTS

CA   2 641 463 A1   8/2007
JP   2008-507651   3/2008
(Continued)

OTHER PUBLICATIONS

Notice of Allowance dated Jul. 3, 2017 in U.S. Appl. No. 15/032,519.

*Primary Examiner* — Monica Huson
(74) *Attorney, Agent, or Firm* — Oblon, McClelland, Maier & Neustadt, L.L.P.

(57) ABSTRACT

A method of manufacturing a fuel tank includes: passing a hollow molten resin projection, that projects-out in a wall-thickness direction and is formed at a molten resin sheet that becomes a tank structural member structuring a tank main body, through a mounting hole of a part-to-be-mounted that is placed on the molten resin sheet; and pressurizing the molten resin projection from an inner side, and causing at least a portion of the molten resin projection to jut-out to a peripheral portion of the mounting hole of the part-to-be-mounted.

3 Claims, 9 Drawing Sheets

(51) Int. Cl.
  *B60K 15/03*   (2006.01)
  *B29C 69/02*   (2006.01)
  *B29C 51/06*   (2006.01)
  *B29C 51/12*   (2006.01)
  *B29L 31/00*   (2006.01)
  *B29C 49/02*   (2006.01)
  *B29C 49/44*   (2006.01)
  *B29C 51/10*   (2006.01)

(56) References Cited

U.S. PATENT DOCUMENTS

| | | |
|---|---|---|
| 8,161,621 B2 | 4/2012 | Ratfisch |
| 2008/0164639 A1 | 7/2008 | Criel et al. |
| 2009/0152263 A1 | 6/2009 | Criel et al. |
| 2010/0126659 A1 | 5/2010 | Roos et al. |
| 2011/0139793 A1 | 6/2011 | Park |
| 2012/0326357 A1 | 12/2012 | Roos et al. |
| 2014/0034649 A1 | 2/2014 | Criel et al. |
| 2014/0117591 A1 | 5/2014 | Roos et al. |
| 2014/0131918 A1 | 5/2014 | Criel et al. |
| 2016/0158992 A1 | 6/2016 | Criel et al. |
| 2016/0271861 A1* | 9/2016 | Kimura .................. B29C 65/18 |

FOREIGN PATENT DOCUMENTS

| | | |
|---|---|---|
| JP | 2008-517807 | 5/2008 |
| JP | 2010-526682 | 8/2010 |
| JP | 2012-501265 | 1/2012 |
| JP | 2012-66587 | 4/2012 |
| JP | 2015-085916 A | 5/2015 |
| WO | 2006/008308 A1 | 1/2006 |
| WO | 2015/010915 A1 | 1/2015 |
| WO | 2015/063582 A1 | 5/2015 |

* cited by examiner

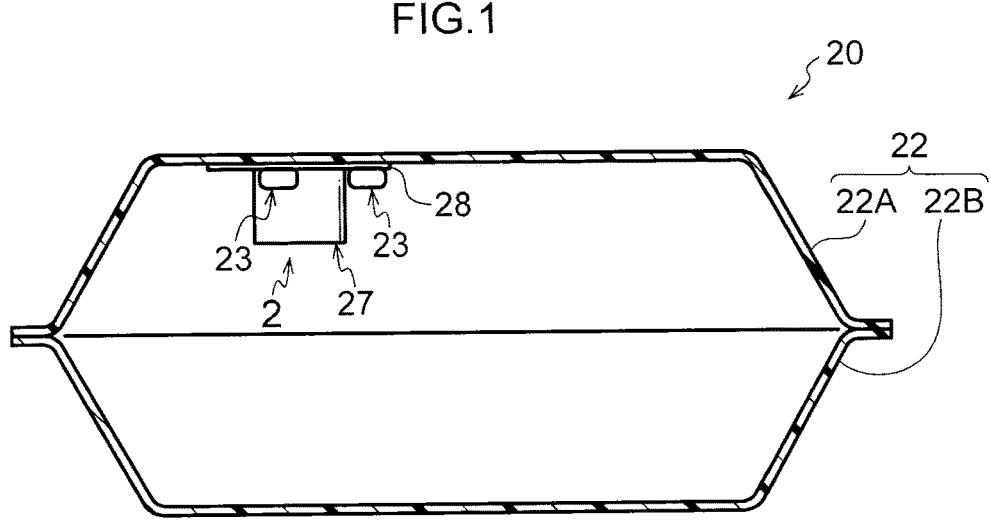
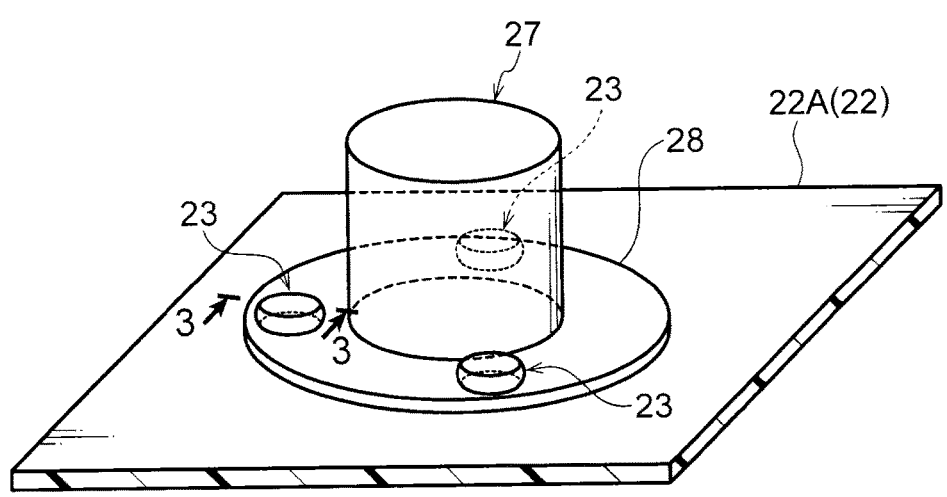

FUEL TANK MANUFACTURING METHOD AND FUEL TANK

CROSS-REFERENCE TO RELATED APPLICATION

This application is based on and claims priority under 35 USC 119 from Japanese Patent Application No. 2014-145391 filed on Jul. 15, 2014, the disclosure of which is incorporated by reference herein.

BACKGROUND

Technical Field

The present invention relates to a method of manufacturing a fuel tank, and to a fuel tank.

Related Art

As a method of mounting a part-to-be-mounted to a fuel tank that is formed from resin, there is a method of fixing a part-to-be-mounted to a fuel tank by melting a portion of the fuel tank, and, in a state in which the molten portion is pushed-into a mounting hole of the part-to-be-mounted, applying pressure to the molten portion so as to push and spread-out the molten portion, and cooling and solidifying the resin in a state in which the peripheral portion of the mounting hole of the part-to-be-mounted is nipped between the pushed and spread-out portion and the other portion of the fuel tank (see, for example, Japanese National Publication (JP-A) No. 2008-507651).

In the technique disclosed in JP-A No. 2008-507651, the mounting portion that is for mounting the part-to-be-mounted to the fuel tank is formed by melting a portion of the fuel tank. Namely, resin that is for forming the mounting portion must be secured from the periphery of the portion that forms the mounting portion.

SUMMARY

In consideration of the above-described circumstances, an object of an aspect of the present invention is to provide a method of manufacturing a fuel tank that can reduce the amount of resin that is needed in order to form a mounting portion that is for mounting a part-to-be-mounted to a fuel tank, and a fuel tank that can reduce the amount of resin of a mounting portion that is for mounting a part-to-be-mounted.

A method of manufacturing a fuel tank of a first aspect of the present invention includes: passing a hollow molten resin projection, that projects-out in a wall-thickness direction and is formed at a molten resin sheet that becomes a tank structural member structuring a tank main body, through a mounting hole of a part-to-be-mounted that is placed on the molten resin sheet; and pressurizing the molten resin projection from an inner side, and causing at least a portion of the molten resin projection to jut-out to a peripheral portion of the mounting hole of the part-to-be-mounted.

In the method of manufacturing a fuel tank of the first aspect, after the molten resin projection that is hollow is passed-through the mounting hole of the part-to-be-mounted, the molten resin projection is pressurized from the inner side, and at least a portion of the molten resin projection is made to jut-out to the peripheral portion of the mounting hole of the part-to-be-mounted. Therefore, after cooling and solidifying of the molten resin, the aforementioned peripheral portion is nipped between the jutting-out portion formed at the protrusion and the general portion of the tank main body, and the part-to-be-mounted is mounted to the tank structural member that structures the tank main body.

Here, the mounting portion (the mounting portion that is formed by the protrusion and the jutting-out portion of the protrusion), that is for mounting the part-to-be-mounted to the tank structural member, is formed by pressurizing the molten resin projection that is hollow from the inner side and causing the molten resin projection to jut-out to the aforementioned peripheral portion. Therefore, the amount of resin that is needed for forming the mounting portion can be reduced as compared with, for example, a structure in which the mounting portion is formed by pressurizing a molten resin projection, that is not hollow, the outer side and causing at least a portion thereof to jut-out to the aforementioned peripheral portion.

In a method of manufacturing a fuel tank of a second aspect of the present invention, in the method of manufacturing a fuel tank of the first aspect, a projecting member, that projects-out from a mold surface at which the molten resin sheet is placed and that forms the molten resin projection at the molten resin sheet, is provided at a molding die for molding the tank structural member, and an elastic body, that expands due to supply of a non-compressible fluid and pressurizes the molten resin projection from an inner side, is provided at the projecting member, and the molten resin projection is formed by the projecting member at the molten resin sheet that is placed along the mold surface, and the elastic body is expanded due to supply of the fluid, and pressurizes the molten resin projection from the inner side.

In the method of manufacturing a fuel tank of the second aspect, because the elastic body is expanded and the molten resin projection is pressurized from the inner side, the pressure that is applied to the portion of the molten resin projection, which portion contacts the elastic body, can be made to be near uniform.

In a method of manufacturing a fuel tank of a third aspect of the present invention, in the method of manufacturing a fuel tank of the second aspect, the elastic body covers the projecting member, and the fluid is supplied through a flow path that is provided at the projecting member.

In the method of manufacturing a fuel tank of the third aspect, when non-compressible fluid is supplied through the flow path of the projecting member, the elastic body that covers the projecting member expands substantially uniformly over the periphery, at the outer peripheral side of the projecting member and with the projecting member as the center. Therefore, the amount of jutting-out of the molten resin projection, that is pressurized from the inner side by the elastic body, can be made to be near uniform over the periphery.

In a method of manufacturing a fuel tank of a fourth aspect of the present invention, in the method of manufacturing a fuel tank of the third aspect, a concave portion, that is continuous or discontinuous in a peripheral direction, is formed in at least one of an outer peripheral surface or an inner peripheral surface of the elastic body.

In the method of manufacturing a fuel tank of the fourth aspect, the concave portion, that is continuous or discontinuous in the peripheral direction, is formed in at least one of the outer peripheral surface and the inner peripheral surface of the elastic body. Therefore, the concave portion becomes the deformation starting point at the time when the elastic body expands, and it is easy to control the expanded shape of the elastic body.

A fuel tank of a fifth aspect of the present invention has: a tank main body that is formed of resin and can accommodate fuel; a protrusion that is formed at the tank main body, projects-out in a wall-thickness direction of the tank main body, and is formed in a shape of a tube whose interior is hollow, whose top portion is closed-off, and that passes-through a mounting hole of a part-to-be-mounted; and an overhanging portion that is structured to include a first overhanging portion that is formed at a portion of the protrusion which portion has passed-through the mounting hole, that juts-out to a peripheral portion of the mounting hole of the part-to-be-mounted, and that, together with a general portion of the tank main body, nips the peripheral portion of the mounting hole of the part-to-be-mounted, and a second overhanging portion that is disposed so as to be apart from the first overhanging portion in a projecting direction of the protrusion.

In the fuel tank of the fifth aspect, the mounting portion, that is for mounting the part-to-be-mounted to the tank main body, is structured by the protrusion and the overhanging portion that is formed at this protrusion. Here, because the protrusion is formed in the shape of a tube whose interior is hollow and whose top portion is closed-off, the amount of resin of the mounting portion can be reduced as compared with, for example, a structure in which the interior of the protrusion is not hollow.

The method of manufacturing a fuel tank of the first aspect of the present invention has the excellent effect that the amount of resin that is needed for forming the mounting portion, that is for mounting the part-to-be-mounted to the fuel tank, can be reduced.

The method of manufacturing a fuel tank of the second aspect of the present invention has the excellent effect that the pressure that is applied to the portion of the molten resin projection, which portion contacts the elastic body, can be made to be near uniform.

The method of manufacturing a fuel tank of the third aspect of the present invention has the excellent effect that the amount of jutting-out of the molten resin projection, that is pressurized from the inner side by the elastic body, can be made to be near uniform over the periphery.

The method of manufacturing a fuel tank of the fourth aspect of the present invention has the excellent effect that it is easy to control the expanded shape of the elastic body.

The fuel tank of the fifth aspect of the present invention has the excellent effect that the amount of resin of the mounting portion, that is for mounting the part-to-be-mounted, can be reduced.

BRIEF DESCRIPTION OF THE DRAWINGS

Exemplary embodiments of the present invention will be described in detail based on the following figures, wherein:

FIG. 1 is a cross-sectional view of a fuel tank relating to an embodiment of the present invention.

FIG. 2 is an enlarged view of the portion indicated by arrow 2 in FIG. 1.

DETAILED DESCRIPTION

Figure 3:
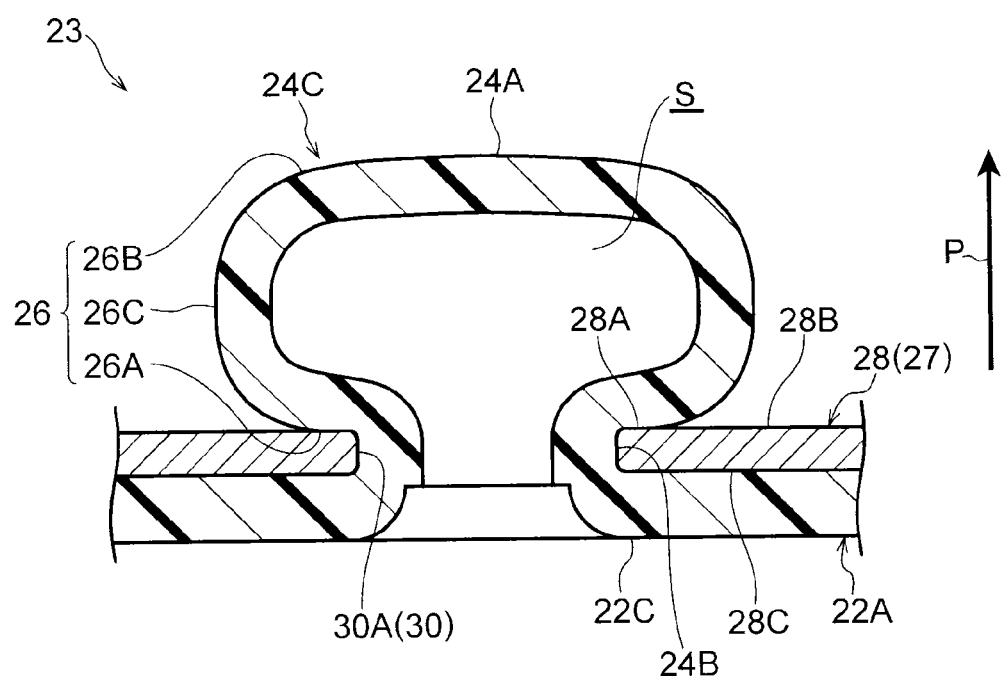
FIG. 3 is a cross-sectional view along line 3-3 of FIG. 2.

A method of manufacturing a fuel tank, and a fuel tank, that relate to an embodiment of the present invention are described hereinafter. A fuel tank 20 of the present embodiment is shown in FIG. 1. This fuel tank 20 is a fuel tank that is installed in a vehicle. Further, the fuel tank 20 has a tank main body 22 that is box-shaped and can accommodate fuel at the interior thereof.

The tank main body 22 is formed of resin (a thermoplastic resin in the present embodiment). Concretely, the tank main body 22 is structured so as to include a resin layer and a barrier layer whose fuel permeability is lower than that of the resin layer (i.e., through which it is more difficult for fuel to pass). For example, high-density polyethylene (HDPE) may be used as the resin that structures the resin layer, and ethylene vinyl alcohol (EVOH) may be used as the material that forms the barrier layer.

Note that opening portions for the connection of pipes, and the like, are formed in the tank main body 22, but illustration of such opening portions is omitted.

Further, the tank main body 22 is formed in a box shape due to the outer peripheral edge portions of a tank structural member 22A and a tank structural member 22B, that are two members that are divided above and below, being joined (welded) together. Note that the tank structural member 22A is formed on the whole in a shape that is convex upward (the state shown in FIG. 1), and the tank structural member 22B is formed on the whole in a shape that is convex downward (the state shown in FIG. 1).

As shown in FIG. 1 and FIG. 2, a part-to-be-mounted 27 (in the present embodiment, a built-in part that is built into the fuel tank 20 interior) is mounted to the interior of the fuel tank main body 22. Concretely, a fastening seat 28, that the part-to-be-mounted 27 has and that is plate-shaped, is mounted to the tank main body 22 by mounting portions 23 that are formed at the ceiling portion of the tank main body 22 (the tank structural member 22A).

For example, small parts such as a breather pipe or a cut-off valve or the like that are used in the fuel tank 20, are examples of the part-to-be-mounted 27. Further, the present invention is not limited to this structure, and the part-to-be-mounted that is mounted to the fuel tank 20 interior may be a large part at which another built-in part is mounted directly, or indirectly via another member. Note that, in a case of mounting a large part to the tank main body 22, the mounting portions 23 of the present embodiment, and mounting portions that have a different structure than the mounting portions 23, may be used together.

As shown in FIG. 3, the mounting portion 23 is formed at the tank structural member 22A, and is structured to include a protrusion 24 that projects-out at the inner side of the tank main body 22, and an overhanging portion 26 that is formed at a protrusion 24.

The protrusion 24 projects-out along the wall-thickness direction (the plate thickness direction) of the tank structural member 22A, and passes-through a mounting hole 30 that is formed in the fastening seat 28 of the part-to-be-mounted 27. The protrusion 24 is formed substantially in the shape of a cylindrical tube whose interior is hollow and whose top portion 24A is closed-off, and the outer peripheral surface of the portion (hereinafter called "inserted portion 24B") that is inserted in the mounting hole 30 fits-tightly to a hole peripheral surface 30A of the mounting hole 30.

The overhanging portion 26 is formed at the portion (hereinafter called "passed-through portion 24C") of the protrusion 24 which portion has passed-through the mounting hole 30, and juts-out toward the outer peripheral side of the protrusion 24 (in other words, at the radial direction outer side of the protrusion 24). Concretely, the overhanging portion 26 juts-out to a peripheral portion 28A of the mounting hole 30 of the fastening seat 28. This overhanging portion 26 is formed once around along the peripheral direction of the protrusion 24. Further, the overhanging portion 26, together with a general portion 22C, nip the peripheral portion 28A of the fastening seat 28. Concretely, a first overhanging portion 26A, that is described later, of the overhanging portion 26 fits-tightly to one surface 28B (the top surface in FIG. 2) of the fastening seat 28, and the general portion 22C fits-tightly to another surface 28C (the bottom surface in FIG. 2). Due thereto, the peripheral portion 28A of the fastening seat 28 is nipped and fixed (fastened) between the overhanging portion 26 and the general portion 22C. Namely, the fastening seat 28 is crimped by the overhanging portion 26 and the general portion 22C.

Further, the overhanging portion 26 is structured to include the first overhanging portion 26A that is continuous with the inserted portion 24B and juts-out toward the radial direction outer side of the protrusion 24, a second overhanging portion 26B that is continuous with the top portion 24A and juts-out toward the radial direction outer side of the protrusion 24, and a standing wall portion 26C that connects the first overhanging portion 26A and the second overhanging portion 26B and extends in the projecting direction of the protrusion 24. Therefore, when viewing the overhanging portion 26 in the cross-section (the cross-section shown in FIG. 3) along the projecting direction of the protrusion 24 (the arrow P direction shown in FIG. 3), the overhanging portion 26 is a shape that is bent into a U-shape, and the first overhanging portion 26A and the second overhanging portion 26B are disposed so as to be apart from one another in the projecting direction of the protrusion 24.

Note that the overhanging portion 26 of the present embodiment indicates the portion, whose diameter is larger than the inserted portion 24B, of the protrusion 24.

Figure 4:
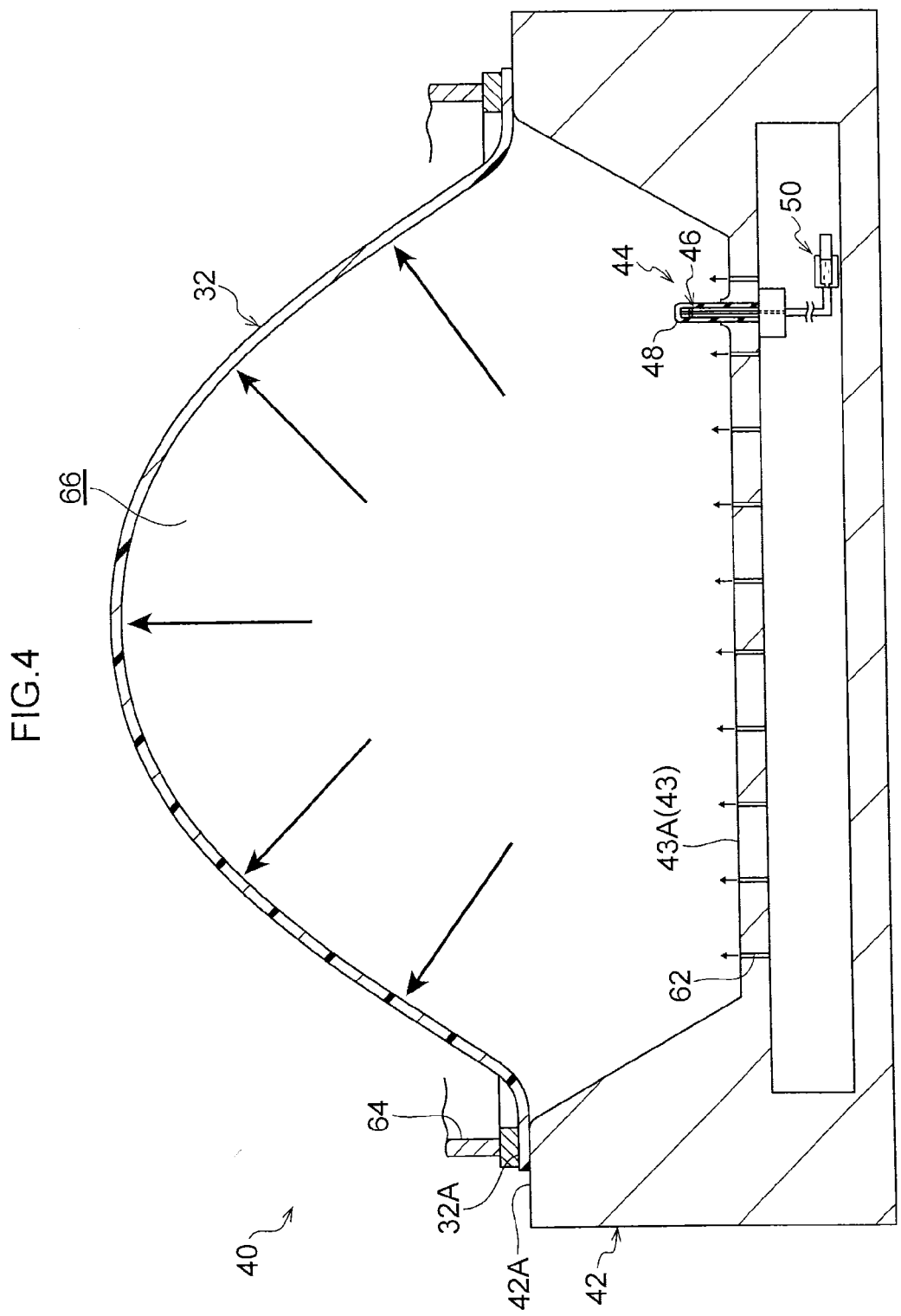
FIG. 4 is a cross-sectional view of a molten resin sheet that becomes a tank main body, and shows a state in which the molten resin sheet is set at a molding die and expanded.
Figure 6:
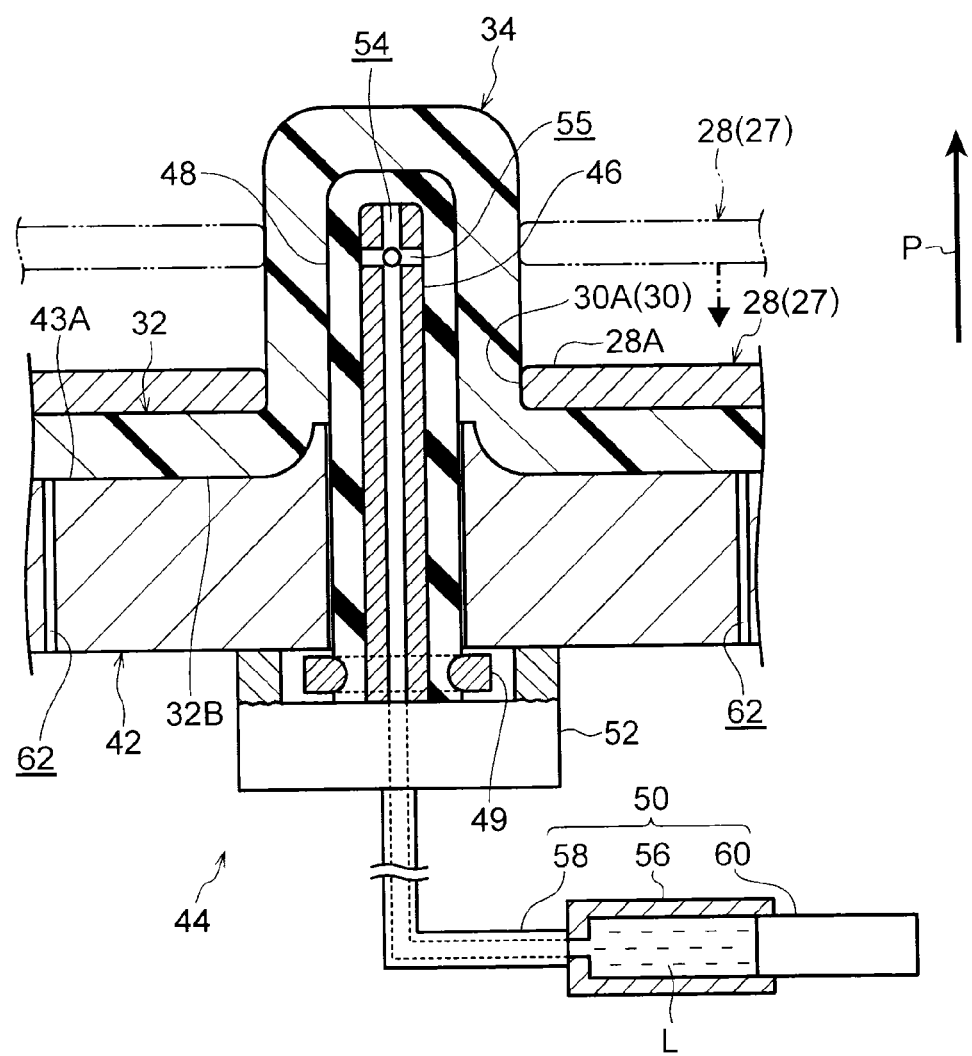
FIG. 6 is an enlarged view of the portion indicated by arrow 6 in FIG. 5, and shows a state in which a molten resin projection has passed-through a mounting hole of a part-to-be-mounted.

Next, a molding device 40 that molds the tank structural member 22A of the fuel tank 20 of the present embodiment is described. As shown in FIG. 4 and FIG. 6, the molding device 40 has various types of structural members such as a molding die 42, a mounting portion molding device 44, and the like.

As shown in FIG. 4, the molding die 42 is a metal mold for molding a sheet-shaped molten resin (hereinafter called "molten resin sheet 32") into the tank structural member 22A. The molding die 42 has a cavity 43 that matches the shape of the tank structural member 22A.

The mounting portion molding device 44 has a projecting pin 46 that projects-out from a cavity surface 43A (die surface) of the molding die 42 in a direction orthogonal to the cavity surface 43A, an elastic body film 48 that covers the projecting pin 46, and a fluid supplying unit 50 that supplies a non-compressible fluid L to the elastic body film 48. Note that the projecting pin 46 of the present embodiment is an example of the projecting member of the present invention, and the elastic body film 48 of the present embodiment is an example of the elastic body of the present invention.

As shown in FIG. 4, the projecting pin 46 is formed in a substantially solid cylindrical shape, and is supported by a bracket 52 that is mounted to the interior of the molding die 42, and passes-through the molding die 42 and projects-out from the cavity surface 43A. As shown in FIG. 6, a flow path 54, that extends along the axial direction (the projecting direction) of the projecting pin 46 and opens at the top surface, is formed at the interior of the projecting pin 46. Plural (four in the present embodiment) branched-off flow paths 55, that branch-off from the flow path 54 in directions orthogonal to the axial direction of the projecting pin 46, are formed at the top surface side of the projecting pin 46. These branched-off flow paths 55 open at the outer peripheral surface of the projecting pin 46. Note that, in the present embodiment, as shown in FIG. 6, the branched-off flow paths 55 branch-off from the flow path 54 at the same position, but the present invention is not limited to this structure. For example, the respective branched-off flow paths 55 may be formed at different positions of the flow path 54.

The elastic body film 48 is formed in the shape of a cylindrical tube whose top portion is closed-off, and the projecting pin 46 is inserted in the inner portion of the elastic body film 48, and the elastic body film 48 covers the projecting pin 46. Further, the open end portion side (the lower end portion side in FIG. 6) of the elastic body film 46 is fastened by a seal ring 49 and fixed to the projecting pin 46. The inner portion of the elastic body film 48 is set in a sealed state due to this seal ring 49. Therefore, due to the fluid L being supplied through the flow path 54 to the inner portion of the elastic body film 48, the elastic body film 48 expands. Due to the fluid L being discharged through the flow path 54 from the inner portion of the elastic body film 48, the elastic body film 48 contracts.

Note that the material that forms the elastic body film 48 is not particularly limited provided that it is a material that can withstand temperatures at which the molten state of the resin that structures the molten resin sheet 32 that is described later can be maintained, and that can expand due to the supplying of the fluid L at temperatures below that, and moreover, that can contract due to discharging of the fluid L after cooling and solidifying of the molten resin. However, it is good to use, for example, silicon rubber of a heat resistance temperature of around 250° C.

The fluid supplying unit 50 is disposed within the molding die 42. This fluid supplying unit 50 has a cylinder 56 in which the fluid L is stored, a pipe 58 that communicates the interior of the cylinder 56 and the flow path 54 of the projecting pin 46, and a piston 60 that, by moving within the cylinder 56, increases and decreases the volume of the fluid storage chamber in which the fluid L within the cylinder 56 is stored.

Figure 7:
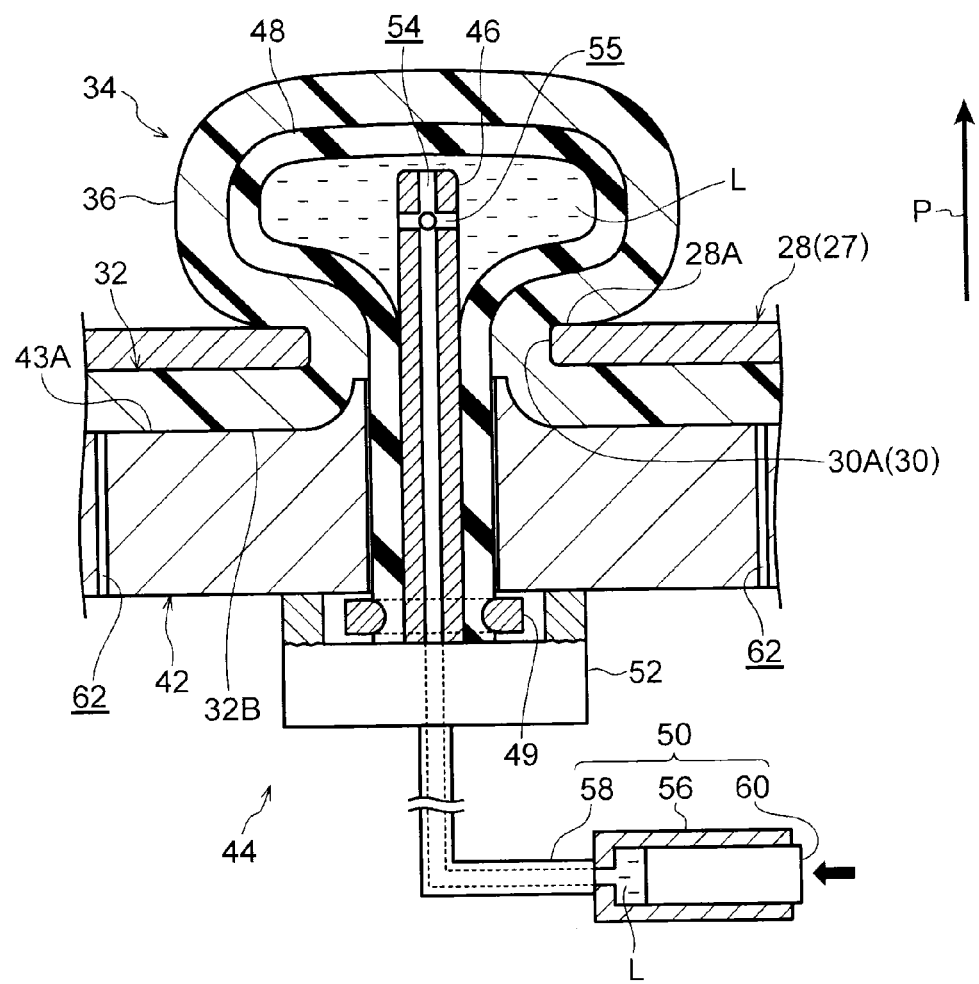
FIG. 7 is a cross-sectional view of the molten resin projection, and shows a state in which the portion, that has passed-through the mounting hole, of the molten resin projection of FIG. 6 is pressurized from the inner side and is made to jut-out to the peripheral portion of the mounting hole of the part-to-be-mounted.

The cylinder 56 is shaped as a cylindrical tube, and the pipe 58 is connected to an axial direction one end portion thereof (the end portion at the cylinder head side). The piston 60 that is shaped as a solid cylinder is inserted in the axial direction other end side of the cylinder 56. Here, as shown in FIG. 7, when the piston 60 is pushed into the cylinder 56, the volume of the fluid storage chamber within the cylinder 56 decreases, and the fluid L is pushed-out from the fluid storage chamber. The pushed-out fluid L passes-through the pipe 58, the flow path 54 and the branched-off flow paths 55, and is supplied to the inner portion of the elastic body film 48. On the other hand, when the pushed-in piston 60 is pulled back from the interior of the cylinder 56, the volume of the fluid storage chamber within the cylinder 56 increases, and the fluid L is pulled back (collected) into the fluid storage chamber. Therefore, the fluid L is sucked-in from the inner portion of the elastic body film 48 through the flow path 54, the branched-off flow paths 55 and the pipe 58. Note that what is called the fluid storage chamber here is the space (see FIG. 7 and FIG. 8) that is formed between the inner peripheral surface of the cylinder 56 and the end surface of the piston 60, and indicates the portion where the fluid L is stored.

The piston 60 is formed in the shape of a solid cylinder, and an unillustrated actuator is connected to the end portion thereof that is at the side opposite the fluid storage chamber. The piston 60 is structured so as to move within the cylinder 56 due to power from the actuator. Note that, for example, an air cylinder, an oil cylinder, or a servo motor can be used as the actuator, but the present invention is not limited to such structures. Further, unillustrated packing is mounted to the outer periphery of the piston 60 to prevent leakage of the fluid L.

Note that the fluid L that is used in the fluid supplying unit 50 is not particularly limited provided that it is non-compressible, and, for example, water, oil, and liquid silicon are examples thereof.

As shown in FIG. 4, gas flow paths 62, that pass-through the interior of the molding die 42 and open at the cavity surface 43A, are provided at the molding die 42. The gas flow paths 62 are connected to an unillustrated air pressure circuit. This air pressure circuit is connected to a pressurized gas generating device (not illustrated) and a negative pressure generating device (not illustrated), and is structured so as to be able to supply pressurized gas through the gas flow paths 62 to the cavity 43 periphery, or so as to be able to suck gas that is at the cavity 43 periphery. Note that, in the present embodiment, a positive pressure pump is used as an example of the pressurized gas generating device, and a negative pressure pump (vacuum pump) is used as an example of the negative pressure generating device.

An outer peripheral edge portion 32A of the molten resin sheet 32 that has been introduced into the cavity mold 42 is pressed-against a peripheral portion 42A of the cavity surface 43A of the molding die 42 by a pressing machine 64. This pressing machine 64 is structured so as to push the entire outer peripheral edge portion 32A of the molten resin sheet 32 against the peripheral portion 42A of the molding die 42. When the molten resin sheet 32 is set (placed) within the molding die 42 by using this pressing machine 64, the space between the molten resin sheet 32 and the cavity surface 43A becomes a sealed space (i.e., a sealed space 66 is formed). Note that by using the aforementioned air pressure circuit, pressurized gas (in the present embodiment, pressurized air) is supplied into the sealed space 66 and the interior of the sealed space 66 can be pressurized, or gas is sucked from the interior of the sealed space 66 and the pressure of the sealed space 66 can be reduced.

A method of manufacturing the fuel tank 20 of the present embodiment is described next.

(Setting Step)

First, the molten resin sheet 32, that becomes the tank structural member 22A that structures the tank main body 22, is manufactured, and this molten resin sheet 32 is introduced into the molding die 42 of the molding device 40. Then, the outer peripheral edge portion 32A of the molten resin sheet 32 is pressed against the peripheral portion 42A of the molding die 42 by the pressing machine 64, and the molten resin sheet 32 is set at the molding die 42.

(Stretching Step)

Next, as shown in FIG. 4, gas is supplied from the air pressure circuit through the gas flow paths 62 to the sealed space 66 that is formed between the molten resin sheet 32 and the cavity surface 43A, and the interior of the sealed space 66 is pressurized, and the molten resin sheet 32 is expanded and stretched into the shape of a balloon. Due thereto, the wall-thickness of the expanded portion of the molten resin sheet 32 is made uniform. Further, the molten resin sheet 32 is provided with extra length with respect to the cavity surface 43A. Note that the extra length of the molten resin sheet 32 can be varied by adjusting the pressure of the sealed space 66 interior. Preferably, an extra length of the molten resin sheet 32, that corresponds to the amount of resin that is needed in order to form molten resin projections 34 that are described later, is provided (generated).

(Shaping Step)

Figure 5:
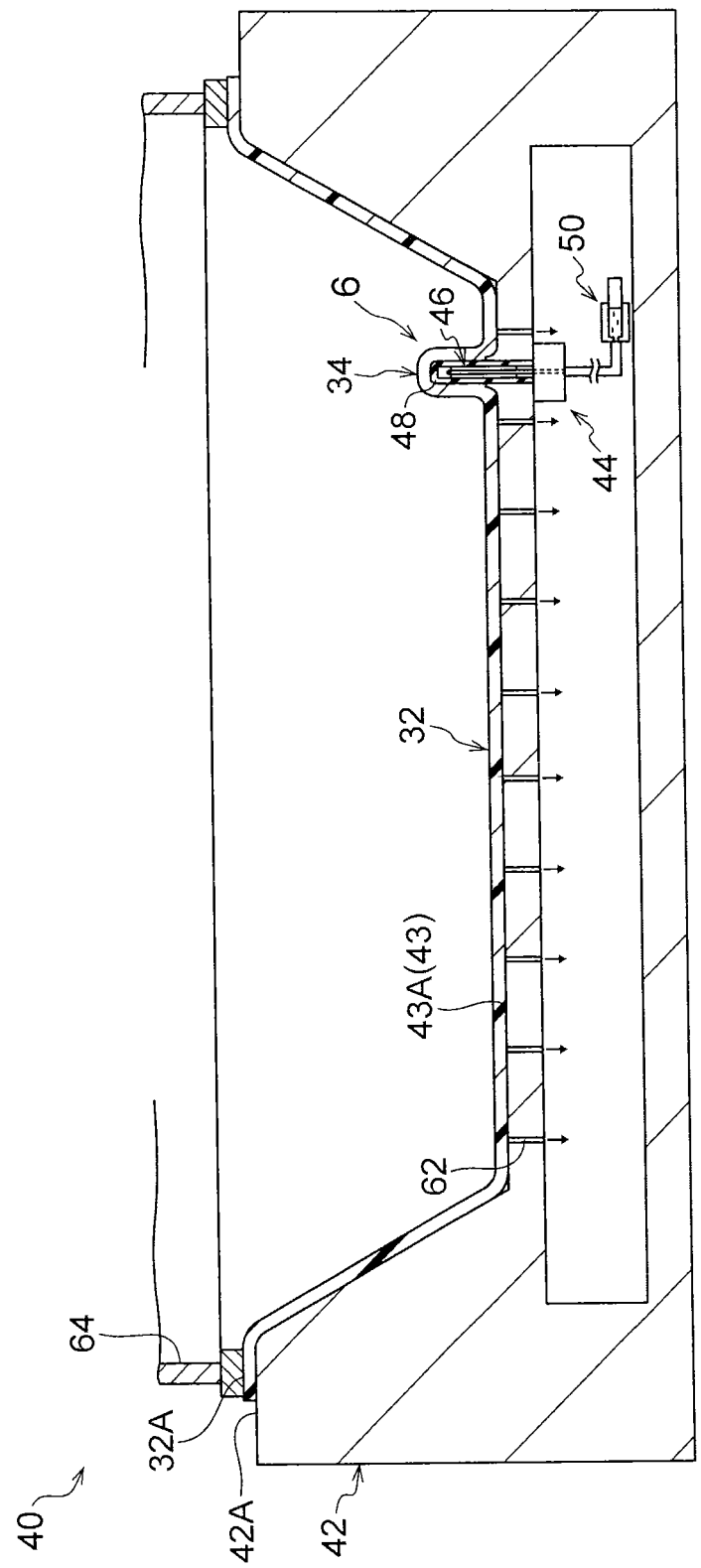
FIG. 5 is a cross-sectional view of the molten resin sheet, and shows a state in which the molten resin sheet, that has been provided with extra length by being expanded, is disposed along a cavity surface of the molding die.

Next, as shown in FIG. 5, air is sucked from the sealed space 66 through the gas flow paths 62 so as to reduce the pressure of the sealed space 66 interior, and the molten resin sheet 32 that was stretched is made to fit tightly to the cavity surface 43A. Due thereto, the molten resin sheet 32 that was stretched is disposed along the cavity surface 43A. At this time, because the projecting pins 46 that are covered by the elastic body film 48 project-out from the cavity surface 43A, the portions of the molten resin sheet 32 that was stretched, which portions abut the projecting pins 46 via the elastic body film 48, project-out in the wall-thickness direction of the molten resin sheet 32, and the molten resin projections 34 are formed. Note that the extra length of the molten resin sheet 32 that was stretched aggregates around the projecting pins 46 and forms the molten resin projections 34. In this way, the molten resin sheet 32 that was stretched is shaped into the form of the tank structural member 22A.

(Placement Step)

Next, as shown in FIG. 6, the molten resin projections 34 are inserted into and passed-through the mounting holes 30 that are formed in the fastening seat 28 of the part-to-be-mounted 27, and the fastening seat 28 is placed on the molten resin sheet 32 that was stretched, and the other surface 28C of the fastening seat 28 is made to fit tightly to the molten resin sheet 32.

(Pressurizing Step)

Next, as shown in FIG. 7, in the state in which the molten resin projections 34 are passed-through the mounting holes 30 of the part-to-be-mounted 27, the molten resin projections 34 are pressurized from the inner sides, and at least portions of the molten resin projections 34 (in the present embodiment, the entire portions, that have passed-through the mounting holes 30, of the molten resin projections 34) are made to jut-out toward the outer peripheral side. Concretely, due to the fluid L being supplied from the fluid supply unit 50 through the flow path 54 to the elastic body film 48, the elastic body film 48 is expanded, and the molten resin projections 34 are pressurized from the inner sides and are deformed so as to jut-out toward the outer peripheral sides (the radial direction outer sides) of the molten resin projections 34. This pressurization is carried out until the portions, that have passed-through the mounting holes 30, of the molten resin projections 34 jut-out to the peripheral portions 28A of the mounting holes 30. Due thereto, overhanging portions 36 that jut-out toward the outer peripheral sides are formed at the molten resin projections 34. The overhanging portions 36 fit-tightly to the one surface 28B of the fastening seat 28, and, together with a general portion 32B of the molten resin sheet 32, nip the peripheral portions 28A. Further, the portions, that are inserted in the mounting holes 30, of the molten resin projections 34 also jut-out toward the outer peripheral sides due to the pressure from the elastic body film 48, and fit-tightly to the hole wall surfaces 30A of the mounting holes 30. Note that the general portion 32B of the present embodiment indicates the portion, that contacts the fastening seat 28, of the molten resin sheet 32 that was stretched.

(Cooling Step)

Figure 8:
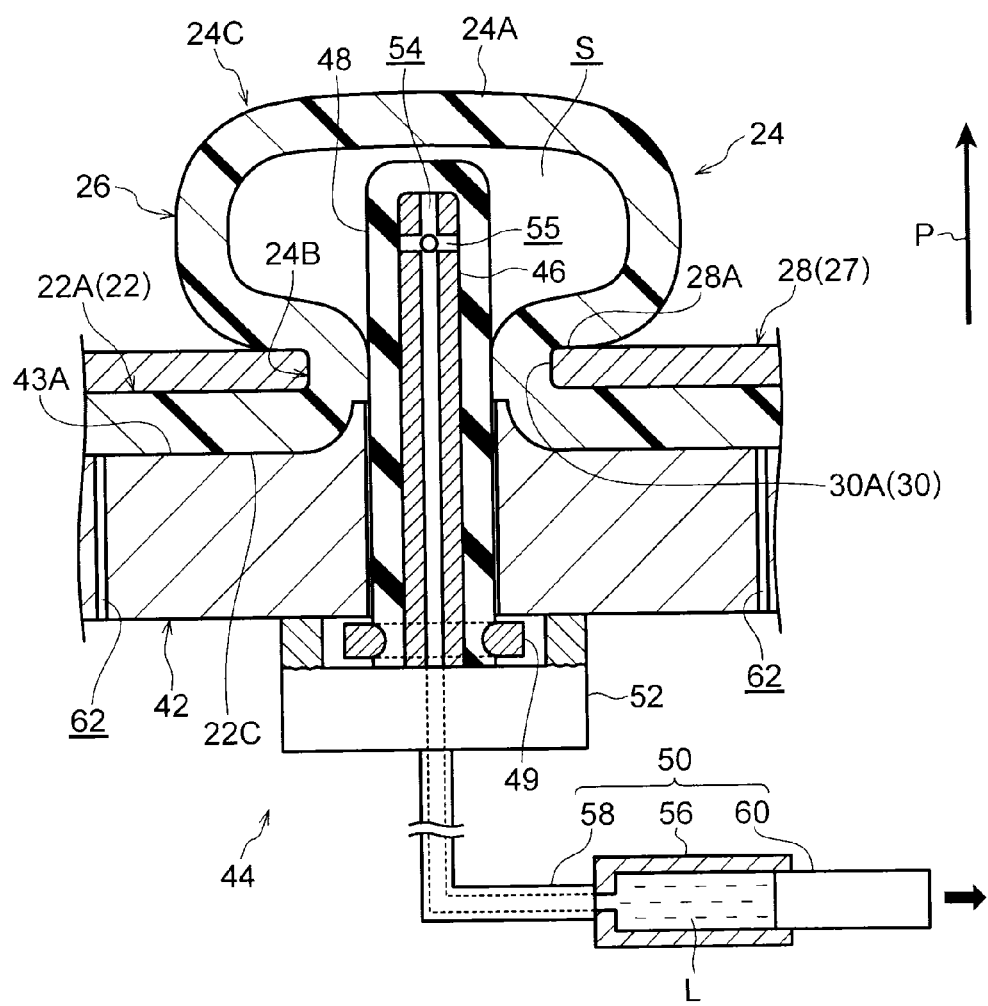
FIG. 8 is a cross-sectional view of the molten resin projection, and shows a state in which an elastic body of FIG. 7 has been contracted.

Next, in the state in which a molten resin sheet (not illustrated) is placed along the die surface of a molding die (not illustrated) for forming the tank structural member 22B, this molding die and the molding die 42 are set together, and, in the state in which the outer peripheral edge portion 32A of the molten resin sheet 32 that becomes the tank structural member 22A and the outer peripheral edge portion of the molten resin sheet that becomes the tank structural member 22B are superposed together, the molten resin is cooled and solidified. Due thereto, the tank main body 22 that is structured to include the tank structural member 22A and the tank structural member 22B is formed. Further, as shown in FIG. 8, the mounting portions 23 for mounting the part-to-be-mounted 27 to the fuel tank 20 are formed at the tank main body 22. The part-to-be-mounted 27 is fixed (fastened) to the tank structural member 22A by the mounting portions 23.

Note that the cooling of the molten resin may be natural cooling or may be forced cooling, but, from the standpoint of shortening the manufacturing time, forced cooling is preferable. Examples of the method of forcibly cooling the molten resin are a method of cooling by blowing-out a gas (e.g., air), and the like.

(Collection Step)

Next, as shown in FIG. 8, the fluid L is collected from the inner portion of the elastic body film 48 through the flow path 54 into the fluid supplying unit 50, and the elastic body film 48 is contracted.

Figure 9:
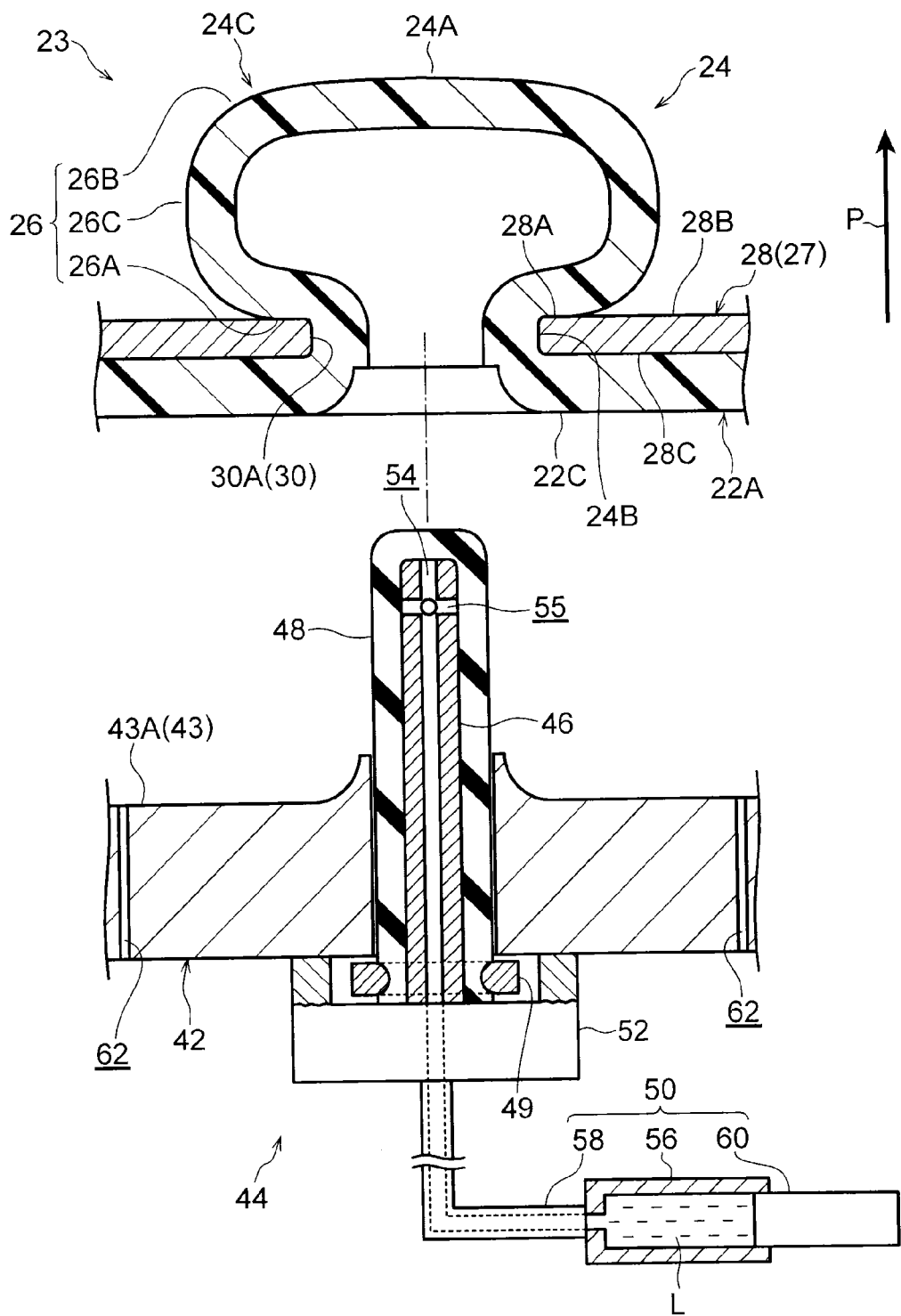
FIG. 9 is a cross-sectional view of a protrusion, and shows a state in which a tank main body is removed from the molding die.

Further, as shown in FIG. 9, the tank main body 22 is completed by causing unillustrated eject pins to project-out and releasing the tank main body 22 from the molding die 42.

Note that, in the method of manufacturing the fuel tank 20 of the present embodiment, the molten resin is cooled and solidified in a state in which the outer peripheral edge portion 32A of the molten resin sheet 32 that becomes the tank structural member 22A and the outer peripheral edge portion of the molten resin sheet that becomes the tank structural member 22B are superposed together. However, the present invention is not limited to this structure. For example, after the tank structural member 22A and the tank structural member 22B are molded separately, the outer peripheral edge portion of the tank structural member 22A and the outer peripheral edge portion of the tank structural member 22B may be superposed and joined (e.g., welded) together so as to form the tank main body 22.

Operation and effects of the method of manufacturing the fuel tank 20, and the fuel tank 20, of the present embodiment are described next.

In the method of manufacturing the fuel tank 20 of the present embodiment, the molten resin projection 34 that is hollow is passed-through the through-hole 30 of the part-to-be-mounted 27 in the placement step. Thereafter, in the pressurizing step, as shown in FIG. 7, the molten resin projection 34 is pressurized from the inner side, and at least a portion of the molten resin projection 34 (in the present embodiment, the entire portion, that has passed-through the mounting hole 30, of the molten resin projection 34) is made to jut-out to the peripheral portion 28A of the mounting hole 30 of the fastening seat 28 of the part-to-be-mounted 27. Therefore, after the molten resin is cooled and solidified, the peripheral portion 28A of the fastening seat 28 is nipped by the overhanging portion 26 that is formed at the protrusion 24 and the general portion 22C of the tank main body 22, and the part-to-be-mounted 27 is mounted to the tank main body 22 (the tank structural member 22A).

Here, the molten resin projection 34 that is hollow is pressurized from the inner side, and is made to jut-out (stretched) to the peripheral portion 28A of the mounting hole 30 of the fastening seat 28, and the mounting portion 23 for mounting the part-to-be-mounted 27 to the tank main body 22 is formed. Therefore, for example, the amount of resin that is needed for forming the mounting portions 23 can be reduced as compared with a structure in which, for example, mounting portions are formed by pressurizing molten resin projections that are not hollow and making the molten resin projections jut-out to the peripheral portions 28A of the mounting holes 30 of the fastening seat 28.

Further, in the pressurizing step, the elastic body film 48 is expanded, and the molten resin projection 34 is pressurized the inner side. Therefore, the pressure that is applied to the portion, that contacts the elastic body film 48, of the molten resin projection 34 can be made to be near uniform. Due thereto, even if the expansion speed and the expansion rate of the elastic body film 48 are increased, the molten resin projection 34 can deform so as to follow the elastic body film 48. Further, because the molten resin projections 34 can be molded by the molding die 42 that is concave and the mounting portion molding device 44, the molding device can be simplified.

Moreover, in the method of manufacturing the fuel tank 20, when the fluid L is supplied through the flow path 54 of the projecting pin 46 to the inner portion of the elastic body film 48, the elastic body film 48 that covers the projecting pin 46 expands substantially uniformly over the periphery, at the outer peripheral side of the projecting pin 46 and with the projecting pin 46 as the center. (In other words, the diameter that is centered around the projecting pin 46 expands substantially uniformly, as seen in a cross-section in a direction orthogonal to the projecting direction of the projecting pin 46.) Therefore, the amount of jutting-out of the molten resin projection 34, that is pressurized from the inner side by the elastic body film 48, can be made to be near uniform over the periphery.

Further, the molten resin projections 34 that become the mounting portions 23 of the fuel tank 20 are formed at the resin molten sheet 32 that is provided with extra length with respect to the cavity surface 43A of the molding die 42 in the stretching step (in the present embodiment, the molten resin sheet 32 that has been stretched). Therefore, the amount of resin that is needed in order to form the mounting portions 23, that have a reduced amount of resin, can be ensured as compared with, for example, a structure in which molten resin projections are formed at a molten resin sheet that is not provided with extra length. Due thereto, a decrease in the strength of the mounting portions 23 of the fuel tank 20 can be suppressed. Note that being provided with (having) extra length with respect to the cavity surface 43A means that the surface area of the molded surface of the molten resin sheet 32 is made wide with respect to the surface area of the cavity surface 43A (the surface area of the surface), such that a surplus portion is obtained (the molten resin sheet has a surplus portion).

Further, because the molten resin sheet 32 is stretched and is provided with extra length in the stretching step, the amount of resin of the molten resin sheet 32 does not vary, and therefore, an increase in the weight of the tank main body 22 can be suppressed. Moreover, because the molten resin sheet 32 is stretched by being pressurized, the molten resin sheet 32 can be stretched uniformly (except for the outer peripheral edge portion 32A).

Further, in the shaping step, the projecting pin 46 is made to abut the stretched molten resin sheet 32 via the elastic body film 48, and forms the molten resin projection 34. Therefore, the interior of the protrusion 24, that is formed by pressurizing the molten resin projection 34 from the inner side and cooling and solidifying, becomes hollow due to the pulling-out of the projecting pin 46 at the time of removal from the mold. Thus, because the interior of the protrusion 24 is formed to be hollow, the amount of resin of the mounting portion 23 that is formed at the fuel tank 20 is reduced. Due thereto, the weight of the fuel tank 20 can be reduced.

Further, the overhanging portion 26 is structured to include the first overhanging portion 26A and the second overhanging portion 26B. Thus, for example, in a case in which the part-to-be-mounted 27 receives load in the wall-thickness direction of the tank main body 22 and toward the inner portion side of the tank main body 22, load in the same direction is inputted to the first overhanging portion 26A as well. At this time, the first overhanging portion 26A and the second overhanging portion 26B are set apart in the projecting direction of the protrusion 24. Namely, there is a space S between the first overhanging portion 26A and the second overhanging portion 26B. Therefore, deformation of the first overhanging portion 26A due to the aforementioned load can be permitted in this space S, and the load that is inputted to the first overhanging portion 26A can be mitigated. Due thereto, the durability of the mounting portion 23 can be ensured.

Further, the overhanging portion 26 has, between the first overhanging portion 26A and the second overhanging portion 26B, the standing wall portion 26C that extends along the projecting direction of the protrusion 24. Therefore, the fastening strength, by which the fastening seat 28 is fastened to the tank main body 22, of the overhanging portion 26 can be ensured by the standing wall portion 26C.

Still further, the mounted state of the part-to-be-mounted 27 (the state in which the peripheral portion 28A of the fastening seat 28 is nipped and fixed by the first overhanging portion 26A and the general portion 22C) can be judged visually by the shape of the opening portion of the mounting portion 23, when viewing the tank main body 22 that is completed from the outer peripheral side (in other words, from the design surface side).

In the method of manufacturing the fuel tank 20 of the above-described embodiment, the molten resin sheet 32 is set at the molding die 42 and is stretched, and after the molten resin projections 34 are shaped at the stretched molten resin sheet 32, the part-to-be-mounted 27 is placed on the molten resin sheet 32, and the molten resin projections 34 are passed-through the mounting holes 30, and thereafter, the pressurizing step is carried out. However, the steps before the pressurizing step are not particularly limited provided that, at the time of carrying out the pressurizing step, there is a state in which the molten resin projections 34 are passed-through the mounting holes 30 of the part-to-be-mounted 27 that is placed on the molten resin sheet 32. For example, there may be a structure in which the molten resin sheet 32 is set at the molding die 42, and the set molten resin sheet 32 is placed along the cavity surface 43A, and thereafter, the fastening seat 28 of the part-to-be-mounted 27 is placed on the molten resin sheet 32, and then, movable pins, that have the same structure as the projecting pins 46 and are movable in the direction orthogonal to the cavity surface 43A, are projected-out from the cavity surface 43A, and, while portions of the molten resin sheet 32 are pushed-out (pushed-up) via the elastic body film 48 that covers the movable pins and the molten resin projections 34 are formed, the molten resin projections 34 are passed-through the mounting holes 30 of the part-to-be-mounted 27, and thereafter, the pressurizing step is carried out.

Figure 10:
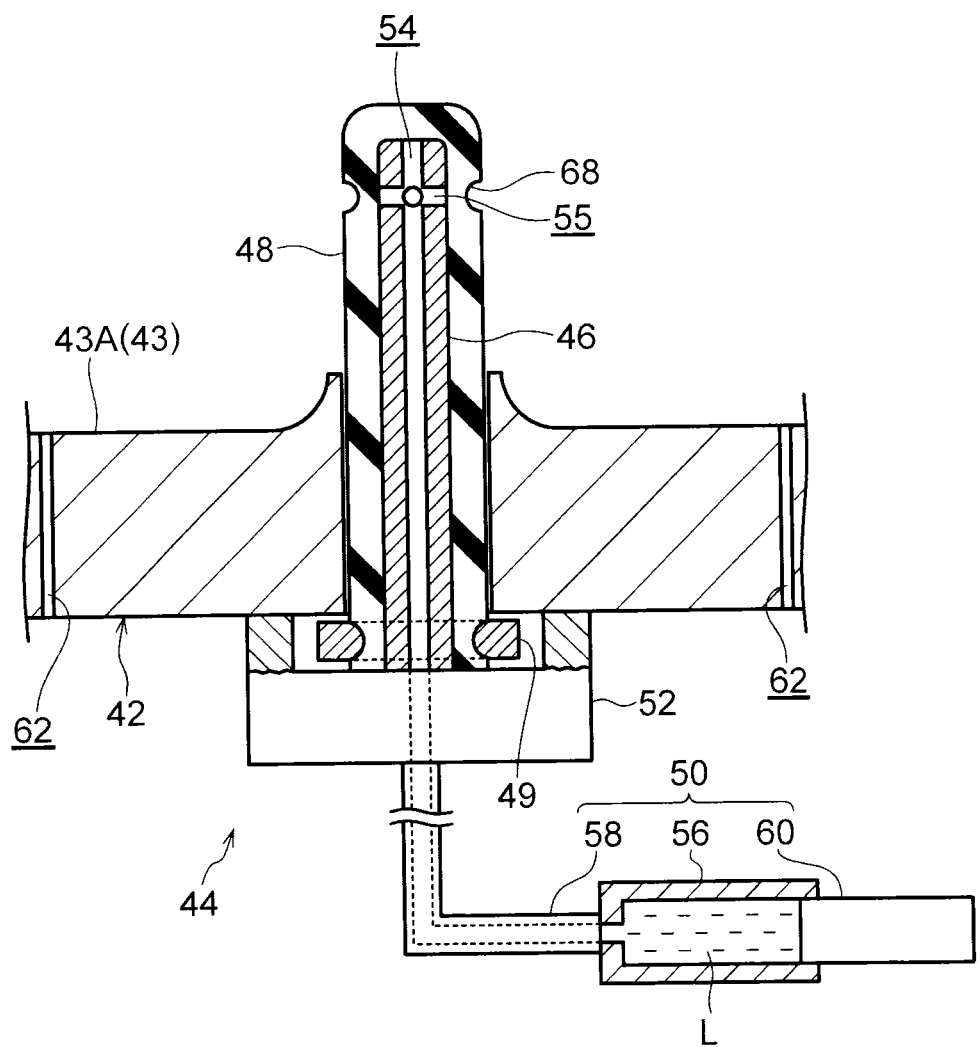
FIG. 10 is a cross-sectional view of a molding device of a modified example.

At the molding device 40 of the above-described embodiment, as shown in FIG. 6, the wall-thickness (film thickness) of the elastic body film 48 in the unloaded state is substantially uniform, but the present invention is not limited to this structure. For example, as shown in FIG. 10, a concave portion 68 may be formed in the outer peripheral surface of the elastic body film 48 that is in the unloaded state, so as to form a thin-wall portion at the elastic body film 48. This concave portion 68 is formed continuously along the peripheral direction in the outer peripheral surface of the elastic body film 48. Here, when the elastic body film 48 is expanded, the concave portion 68 becomes the deformation starting point at the time of expansion, and therefore, it is easy to control the expanded shape of the elastic body film 48. Note that the present invention is not limited to the above-described structure, and may be structured such that concave portions are formed discontinuously in the peripheral direction in the outer peripheral surface of the elastic body film 48. In this case as well, the effect of it being easy to control the expanded shape of the elastic body film 48 is obtained. Further, instead of the outer peripheral surface of the elastic body film 48, the concave portion 68 may be formed in the inner peripheral surface, or the concave portions 68 may be formed respectively in both the outer peripheral surface and the inner peripheral surface of the elastic body film 48.

Further, at the molding device 40 of the above-described embodiment, there is a structure in which the projecting pin 46 is inserted in the elastic body film 48 that is shaped as a cylindrical tube, and the projecting pin 46 is covered by the elastic body film 48. However, the present invention is not limited to this structure, and it suffices for the elastic body film to be provided at least at the portion of the projecting pin 46 which portion passes-through the fastening seat 28. For example, there may be a structure in which the distal end portion side of the projecting pin 46 is covered by an elastic body film that is shaped as a cylindrical tube, and the end portion side of the elastic body film is fit-tightly to and fixed to the outer peripheral surface of the projecting pin 46. Further, for example, the overhanging portion 36 may be formed at the molten resin projection 34 as a structure in which the opening at the top portion side of the flow path 54 of the projecting pin 46 is closed-off, and the both peripheral edge portions of an elastic film body that is formed in the shape of a cylindrical tube are fit-tightly to and fixed to the outer peripheral surface of the projecting pin 46 so as to cover the vicinity of the branched-off flow paths 55.

At the fuel tank 20 of the above-described embodiment, there is a structure in which the overhanging portion 36 is formed once around along the outer periphery of the protrusion 24, but the present invention is not limited to this structure. For example, there may be a structure in which, by forming the overhanging portion 36 by causing only a portion of the portion of the molten resin projection 34 that has passed-through the mounting hole 30 to jut-out, one overhanging portion is formed at the outer periphery of the passed-through portion 24C of the protrusion 24 after cooling and solidifying. Note that there may be a structure in which plural overhanging portions are formed at the outer periphery of the passed-through portion 24C of the protrusion 24.

Although embodiments of the present invention have been described above, the present invention is not limited to the above description, and, of course, can be implemented by being modified in various ways other than the above within a scope that does not depart the gist thereof.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A method of manufacturing a fuel tank, comprising:
    passing a hollow molten resin projection, that projects-out in a wall-thickness direction and is formed at a molten resin sheet that becomes a tank structural member structuring a tank main body, through a mounting hole of a part-to-be-mounted that is placed on the molten resin sheet; and
    pressurizing the molten resin projection from an inner side, and causing at least a portion of the molten resin projection to jut-out to a peripheral portion of the mounting hole of the part-to-be-mounted, wherein
    a projecting member, that projects-out from a mold surface at which the molten resin sheet is placed and that forms the molten resin projection at the molten resin sheet, is provided at a molding die for molding the tank structural member,
    an elastic body, that expands due to supply of a non-compressible fluid and pressurizes the molten resin projection from an inner side, is provided at the projecting member,
    the molten resin projection is formed by the projecting member at the molten resin sheet that is placed along the mold surface, and
    the elastic body is expanded due to supply of the fluid, and pressurizes the molten resin projection from the inner side.

2. The method of manufacturing a fuel tank of claim 1, wherein the elastic body covers the projecting member, and the fluid is supplied through a flow path that is provided at the projecting member.

3. The method of manufacturing a fuel tank of claim 2, wherein a concave portion, that is continuous or discontinuous in a peripheral direction, is formed in at least one of an outer peripheral surface or an inner peripheral surface of the elastic body.

* * * * *

UNITED STATES PATENT AND TRADEMARK OFFICE
CERTIFICATE OF CORRECTION

PATENT NO. : 9,808,981 B2
APPLICATION NO. : 14/798789
DATED : November 7, 2017
INVENTOR(S) : Miki Kimura et al.

Page 1 of 1

It is certified that error appears in the above-identified patent and that said Letters Patent is hereby corrected as shown below:

On the Title Page

Item (73), the Assignee's Information is incorrect. Item (73) should read:
-- (73) Assignee: TOYOTA JIDOSHA KABUSHIKI KAISHA, Toyota-shi (JP) --

Signed and Sealed this
Twenty-first Day of August, 2018

Andrei Iancu
*Director of the United States Patent and Trademark Office*